United States Patent
Reddy

(10) Patent No.: US 8,368,348 B2
(45) Date of Patent: Feb. 5, 2013

(54) AUTOMATED RECHARGING SYSTEM

(75) Inventor: Mahidhar Reddy, Annapolis, MD (US)

(73) Assignee: SemaConnect, Inc., Annapolis, MD (US)

( * ) Notice: Subject to any disclaimer, the term of this patent is extended or adjusted under 35 U.S.C. 154(b) by 933 days.

(21) Appl. No.: 12/211,329

(22) Filed: Sep. 16, 2008

(65) Prior Publication Data

US 2009/0079388 A1   Mar. 26, 2009

Related U.S. Application Data

(60) Provisional application No. 60/994,471, filed on Sep. 20, 2007, provisional application No. 61/130,140, filed on May 29, 2008.

(51) Int. Cl.
*H02J 7/00* (2006.01)
*B60L 9/00* (2006.01)

(52) U.S. Cl. .......................... 320/109; 701/22

(58) Field of Classification Search .................. 320/109
See application file for complete search history.

(56) References Cited

U.S. PATENT DOCUMENTS

| | | | |
|---|---|---|---|
| 4,347,472 A | 8/1982 | Lemelson | |
| 4,383,210 A | 5/1983 | Wilkinson | |
| 4,431,241 A | 2/1984 | Hazelhurt | |
| 4,489,223 A | 12/1984 | Puckett et al. | |
| 4,800,328 A | 1/1989 | Bolger et al. | |
| 4,843,477 A | 6/1989 | Mizutani et al. | |
| 4,902,955 A | 2/1990 | Manis et al. | |
| 5,083,076 A | 1/1992 | Scott | |
| 5,157,319 A | 10/1992 | Klontz et al. | |
| 5,214,368 A | 5/1993 | Wells | |
| 5,252,078 A | 10/1993 | Langenbahn | |
| 5,256,954 A | 10/1993 | Chen | |
| 5,272,431 A | 12/1993 | Nee | |
| 5,306,999 A | 4/1994 | Hoffman | |
| 6,081,205 A | 6/2000 | Williams | |
| 6,614,204 B2 * | 9/2003 | Pellegrino et al. | 320/109 |
| 7,778,746 B2 * | 8/2010 | McLeod et al. | 701/22 |
| 2002/0119364 A1 | 8/2002 | Bushong et al. | |
| 2007/0005202 A1 | 1/2007 | Breed | |
| 2007/0191075 A1 | 8/2007 | Greene et al. | |
| 2007/0199108 A1 * | 8/2007 | Angle et al. | 901/17 |

FOREIGN PATENT DOCUMENTS

| | | |
|---|---|---|
| DE | 23 30 255 | 1/1975 |
| JP | 58-069404 | 4/1983 |
| JP | 63-287607 | 11/1988 |

OTHER PUBLICATIONS

International Search Report and Written Opinion, mailed on Feb. 12, 2009, directed to counterpart International Patent Application No. PCT/US08/77070; 14 pages.

* cited by examiner

*Primary Examiner* — M'Baye Diao
(74) *Attorney, Agent, or Firm* — Womble Carlyle Sandridge & Rice, LLP

(57) ABSTRACT

An automated recharging system to automatically recharge a vehicle is disclosed. A recharging device may be incorporated into the automated recharging system to perform the automatic recharge. The recharging device may include one or more sensors to sense the location of an electrical receptacle of the vehicle, an electrical connector to automatically connect to the receptacle to provide electrical current through the connection, and a controller to cause the connection to be made so as to automatically recharge the vehicle.

13 Claims, 12 Drawing Sheets

SemaCharge

Vechicle number: 98765QWE
Statement from: October 15, 2007 to November 14, 2007

| Date | Location | Energy | Parking | Toll | Total |
|---|---|---|---|---|---|
| 10/23/07 | Annapolis, MD | $0.20 | $0.75 | | $0.95 |
| 10/29/07 | Annapolis, MD | $0.15 | | | $0.15 |
| 11/03/07 | Washington, DC | $0.12 | $1.50 | | $1.62 |
| 11/05/07 | Bay Bridge, MD | | | $2.50 | $2.50 |
| 11/09/07 | Silver Spring, MD | $1.10 | | | $0.10 |
| Total | | | | | $5.32 |

FIG. 11

AUTOMATED RECHARGING SYSTEM

CROSS REFERENCE TO RELATED APPLICATIONS

This application claims the benefit of U.S. Provisional Application Nos. 60/994,471, filed Sep. 20, 2007, and 61/130,140, filed May 29, 2008, the entire contents of which are incorporated herein by reference.

FIELD OF THE INVENTION

This relates to automated recharging systems and, more particularly, to the automatic recharging of a vehicle using an automated recharging system.

BACKGROUND OF THE INVENTION

Electric vehicles (EV) and plug-in hybrid electric vehicles (PHEV) can generally take five to seven hours to fully recharge using standard 110V electrical outlets. As such, a vehicle owner typically connects the vehicle to an electrical outlet every night to recharge overnight so that the vehicle is available for use the next day. This can become a tedious task for the owner and one that the owner is likely to forget to do. If the owner forgets to connect an EV the previous night, the EV may not have enough charge to run. If the owner forgets to connect a PHEV the previous night, the PHEV may still run, but only on gasoline rather than electricity because there may not be enough charge.

To address this issue, some vehicle manufacturers have developed fast recharging circuitry to recharge the vehicles rapidly so that the owner does not have to recharge the vehicle overnight. However, fast recharging can require higher current loads than are currently available through standard 110V outlets. As such, the recharge location would have to be rewired to support the higher load. This could be expensive. Also the higher load could impose strain on the electrical grid. Some vehicle manufacturers have also developed longer lasting batteries to operate for longer periods between recharges. However, these batteries can raise safety concerns and disposal issues and could be expensive. These solutions to the nightly manual connection have not been very effective or practical.

SUMMARY OF THE INVENTION

This relates to an automated recharging system that can be used to automatically recharge a vehicle. A recharging device can be incorporated into the automated recharging system to perform the recharge. In some embodiments, the recharging device can have at least one sensor to sense the location of an electrical receptacle on the vehicle, an electrical connector to automatically connect to the receptacle to provide electrical current to the vehicle, and a controller to cause the connection through which the vehicle may be automatically recharged with the provided electrical current. In some embodiments, the automatic recharging system can have multiple recharging devices to perform recharges and a server in communication with the recharging devices.

BRIEF DESCRIPTION OF THE DRAWINGS

FIG. 11 illustrates an exemplary billing statement for an automated recharging system according to embodiments of the invention.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

This relates to an automated recharging system for automatically recharging a vehicle using one or more recharging devices. A recharging device can automatically connect to, recharge, and disconnect from the vehicle. To do so, the recharging device can have one or more sensors to locate the vehicle's electrical recharge receptacle and a controller to guide the recharging device's electrical connector to the sensed location of the receptacle to connect to the receptacle, deliver electrical current through the connection to recharge the vehicle, and, when the recharging stops, guide the connector away from the sensed location to disconnect from the receptacle. The automated recharging system can provide a more efficient scheme for automatically recharging a vehicle.

Although some embodiments of this invention may be described herein in terms of vehicles, it should be understood that embodiments of this invention are not so limited, but are generally applicable to devices utilizing rechargeable power sources, including but not limited to mobile electronics and appliances.

Figure 1A:
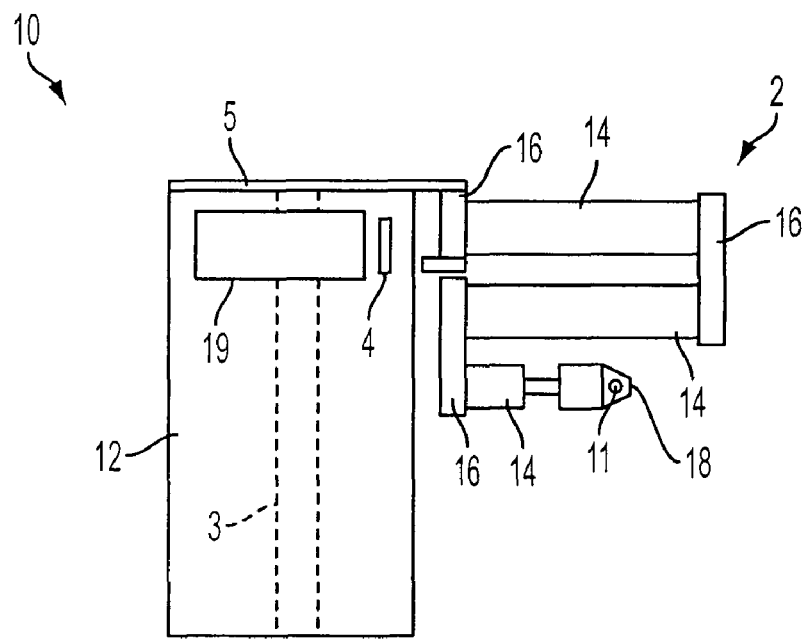
FIG. 1a illustrates an exemplary view of a recharging device according to embodiments of the invention.
Figure 1B:
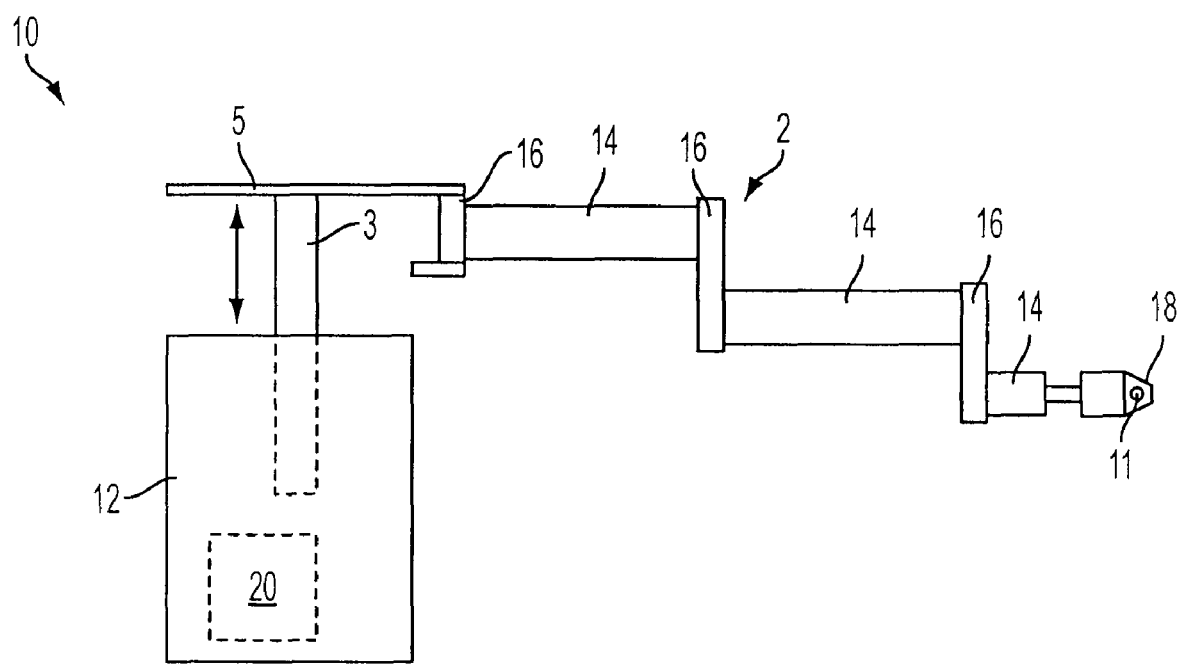
FIG. 1b illustrates another exemplary view of a recharging device according to embodiments of the invention.

FIGS. 1a and 1b illustrate an exemplary recharging device according to embodiments of the invention. FIG. 1a illustrates an exemplary view of a recharging device with a retracted robotic arm and FIG. 1b illustrates an exemplary view of a recharging device with an extended robotic arm. In the examples of FIGS. 1a and 1b, the recharging device 10 can include a housing 12 and a robotic arm 2 attached to the housing. The housing 12 can have electrical circuitry 20 or portions thereof utilized in automatically recharging a vehicle according to embodiments of the invention in and/or on the housing. Examples of the circuitry 20 will be described in more detail in FIG. 2. The housing 12 can include a display 19 to display information to a user of the recharging device 10. The display 19 can have touch screen capability to receive information from the user. The housing 12 can also include an input slot 4 to receive forms of payment from the user, such as a credit or debit card and cash. The housing 12 can include a movable top 5 and house a movable vertical rod 3 disposed on the underside of the top to move the top vertically. The housing 12 and its components can be made of any durable material, such as metal, plastic, or a combination thereof, capable of performing according to embodiments of the invention.

It is to be understood that the structure of the housing is not limited to that illustrated herein, but can include any structure and any components thereon or therein capable of performing according to embodiments of the invention.

The robotic arm 2 can include a plurality of rigid rods 14 attached by a plurality of movable joints 16 and an electrical connector 18 at the distal end of the robotic arm. The electrical connector 18 will be described in more detail in FIGS. 3a through 3d. The robotic arm 2 can also have electrical circuitry 20 or portions thereof utilized for automatically recharging a vehicle according to embodiments of the invention in and/or on the arm. Examples of the circuitry 20 will be described in more detail in FIG. 2. A first movable joint 16 can be fixed to the movable top 5 of the housing 12. A first rod 14 can be fixed to the first movable joint 16 at one end and to a second movable joint 16 at the other end. A second rod 14 can be fixed to the second movable joint 16 at one end and to a third movable joint 16 at the other end. A third rod 14 can be fixed to the third movable joint 16 at one end and to the electrical connector 18 at the other end. The movable joints 16 can rotate horizontally, thereby able to move the robotic arm 2 with three degrees of freedom horizontally. Each joint 16 can have a motor to move the joint independently of the other joints 16. The joint motors can advantageously be lightweight and inexpensive. The motors can further provide low torque so that the robotic arm 2 can safely move at an acceptable speed with minimal force so avoid injury should the arm inadvertently touch a user. The robotic arm 2 can move vertically, thereby able to raise and lower with a degree of freedom vertically. The vertical rod 3 can have a motor, e.g., with screw or worm drive, to move the rod 3, the top 5, and the robotic arm 2 vertically. The robotic arm 2 and its components can be made of any durable material, such as metal, plastic, or a combination thereof, capable of performing according to embodiments of the invention.

It is to be understood that the structure of the robotic arm is not limited to that illustrated herein, but can include any number and type of rods and joints capable of performing according to embodiments of the invention. Moreover, the recharging device is not limited to the use of a robotic arm, but can include any movable mechanism capable of performing according to embodiments of the invention.

The recharging device can be incorporated into an automated recharging system, as will be described later. The recharging device can be used in public or in the home. For example, the recharging device illustrated in FIGS. 1a and 1b can be suitable for public use. A simpler recharging device with limited transmission or communication capabilities or without payment slots can be suitable for home use.

Figure 2:
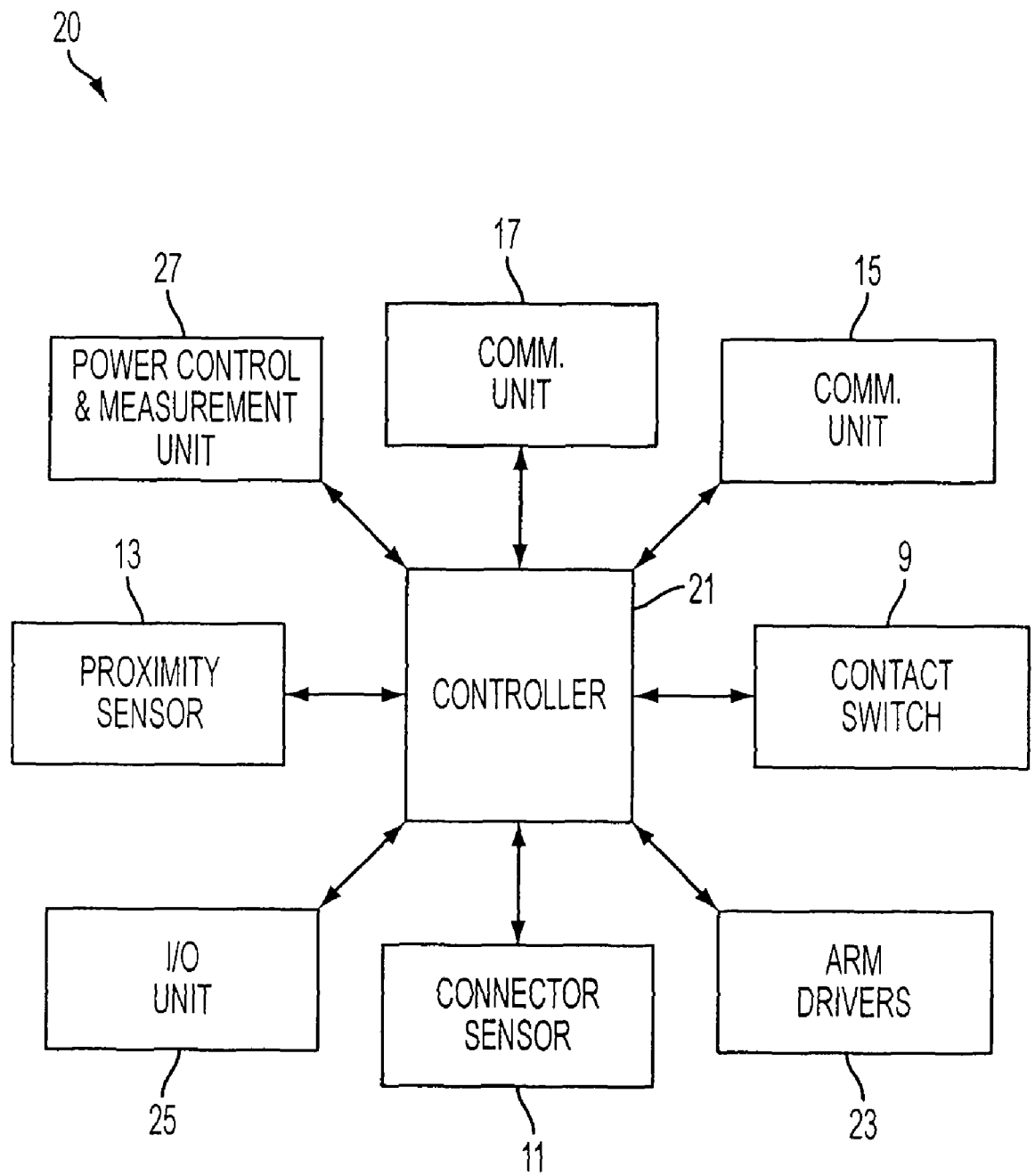
FIG. 2 illustrates exemplary electrical circuitry of a recharging device according to embodiments of the invention.

FIG. 2 illustrates exemplary electrical circuitry of a recharging device according to embodiments of the invention. In the example of FIG. 2, electrical circuitry 20 of a recharging device (such as the recharging device 10 of FIGS. 1a and 1b) can include several circuits, described below. The circuitry 20 can be located in and/or on the housing 12, the robotic arm 2, or both.

A first communication unit 15 can send and receive communications via wireless connection, wired connection, or both. The communication unit 15 can communicate with a vehicle to be recharged by the recharging device 10. Examples of the communication unit 15 can include a radio frequency (RF) unit that can communicate with the vehicle via radio waves, an optical unit that can communicate with the vehicle via light waves, an infrared (IR) unit that can communicate with the vehicle via infrared waves, or any other unit capable of communicating via electromagnetic waves with the vehicle.

A second communication unit 17 can also send and receive communications via wireless connection, wired connection, or both. The communication unit 17 can communicate with a central server on a network. The central server can store information regarding the recharging device 10, the vehicle to be recharged, and the recharge operation. The communication unit 17 can also communicate with other recharging devices on a mesh network. In such a mesh network, all of the devices' communication units 17 can have local communication capabilities to communicate with each other and one of the devices, acting as a gateway, can also have remote communication capabilities to communicate on behalf of it and the other recharging devices with the central server via the gateway device's communication unit 17. Examples of the communication unit 17 can include a LAN or WAN connection, a cellular link that can communicate over a mobile telephone network, or a wired device that can communicate over a public telephone network with the server.

A connector sensor 11 can detect the location of an electrical receptacle on the vehicle to which the electrical connector 18 is to connect. The sensor 11 can detect the position and/or orientation of the receptacle and whether the connector 18 is connected to the receptacle. The sensor 11 can also detect any obstacle between the connector 18 and the receptacle. The sensor 11 can be located on the connector 18 or proximate thereto. Examples of the sensor 11 can include an electrical switch that can contact a corresponding switch on the receptacle, a camera that can capture images of the receptacle, a position sensor that can receive position and orientation information from, e.g., a global positioning satellite system, a rangefinder, such as a laser, an infrared sensor, or an ultrasonic sensor, that can emit a signal that bounces off the receptacle, or any sensor capable of detecting the location and/or orientation of an electrical receptacle according to embodiments of the invention.

A proximity sensor 13 can detect the proximity of the vehicle to the recharging device 10. The sensor 13 can be any known proximity sensor.

A contact switch 9 can detect the completion of the connection of the connector 18 to the receptacle on the vehicle. The switch 9 can be any known contact switch.

Arm drivers 23 can drive the motors for the movable joints 16 of the robotic arm 2 to maneuver the arm so that the connector 18 can connect to the receptacle on the vehicle. The drivers 23 can be any known electronics for driving electromechanical joints.

An input/output unit 25 can communicate with an input device, e.g., the input slot 4 and the display 19, to receive information from the user of the recharging device 10. The unit 25 can also communicate with an output device, e.g., the display 19, to send information from the recharging device 10 to the user.

A power control and measurement unit 27 can open or close an electrical current supply to the vehicle to recharge the vehicle. The unit 27 can also measure the amount of electrical current that the recharging device 10 is dispensing. The unit 27 can be any known electrical circuit for switching and measuring.

A controller 21 can control the electrical circuitry 20. The controller 21 can be a computing device configured to automatically recharge a vehicle according to embodiments of the invention. An exemplary computing device will be described in more detail in FIG. 13. The controller 21 can communicate with the first communication unit 15 to send information to, request information from, or receive information from the vehicle to be recharged by the recharging device 10. Similarly, the controller 21 can communicate with the second communication unit 17 to send information to, request information from, or receive information from the central server and/or to another recharging device. The controller 21 can receive or request proximity information from the proximity sensor 13. The controller 21 can receive or request connector information from the connector sensor 11. The controller 21 can receive or request contact information from the contact switch 9. The controller 21 can communicate with the arm drivers 23 to send movements that the movable joints 16 can make or to receive information from the arm drivers 23 about the movements and/or positions of the joints 16. The controller 21 can communicate with the input/output unit 25 to send information to the output device. Similarly, the controller 21 can communicate with the unit 25 to receive information from the input device. The controller 21 can communicate with the power control and measurement unit 27 to deliver and measure electrical current or to shut off electrical current.

The controller 21 can process the information that it sends and receives. For example, based on information from the proximity sensor 13, the contact switch 9, and the connector sensor 11, the controller 21 can calculate the position of a vehicle, an electrical receptacle on the vehicle, and/or the electrical connector 18. The controller 21 can compare the positions of the receptacle and the connector 18 and calculate the movements that the robotic arm 2 can make in order to complete the connection. The controller 21 can also decide whether to deliver electrical current through the power control and measurement unit 27. Based on information from the arm drivers 23, the controller 21 can determine how much the robotic arm 2 should move. Based on information from the first communication unit 15, the controller 21 can decide whether to shut off electrical current through the power control and measurement unit 27. Based on information from the input/output unit 25, the controller 21 can decide how to respond to the user. Based on information from the second communication unit 17, the controller 21 can decide whether to allow the vehicle to recharge. These and other decisions can be made by the controller 21 based on information sent, received, or processed.

It is to be understood that the circuitry is not limited to that illustrated herein, but can include any electrical circuits capable of performing according to the embodiments of the invention.

Figure 3A:
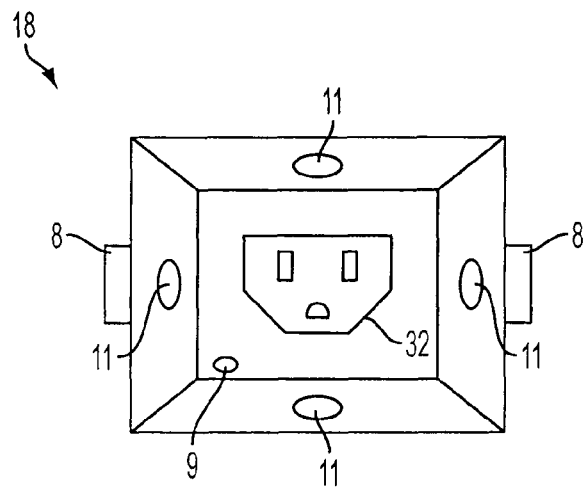
FIG. 3a illustrates an exemplary front view of an electrical connector of a recharging device according to embodiments of the invention.
Figure 3B:
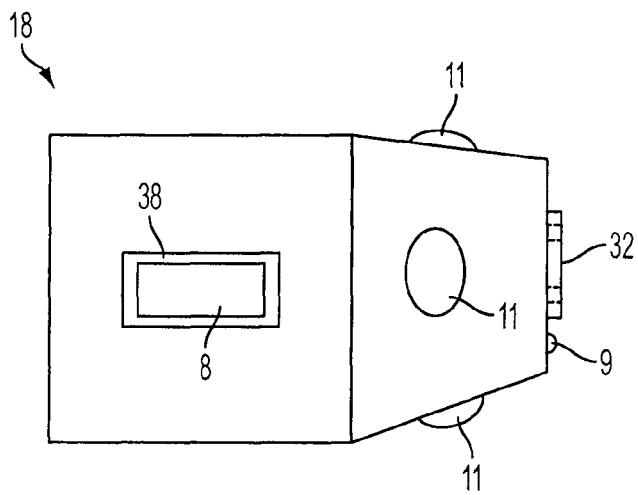
FIG. 3b illustrates an exemplary side view of an electrical connector of a recharging device according to embodiments of the invention.
Figure 3C:
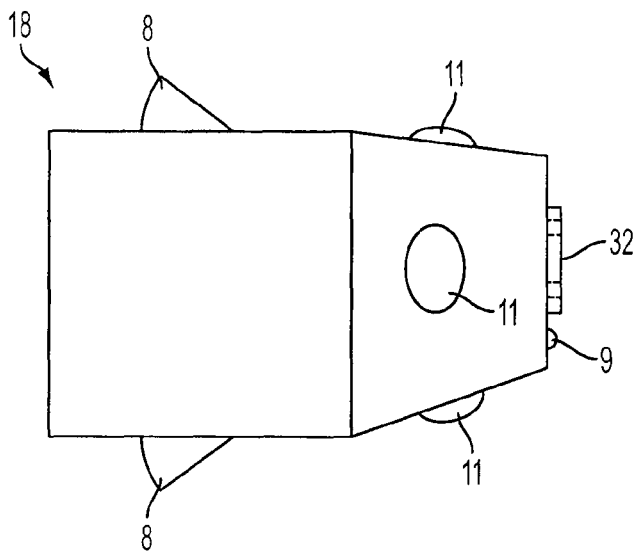
FIG. 3c illustrates an exemplary top view of an electrical connector of a recharging device according to embodiments of the invention.
Figure 3D:
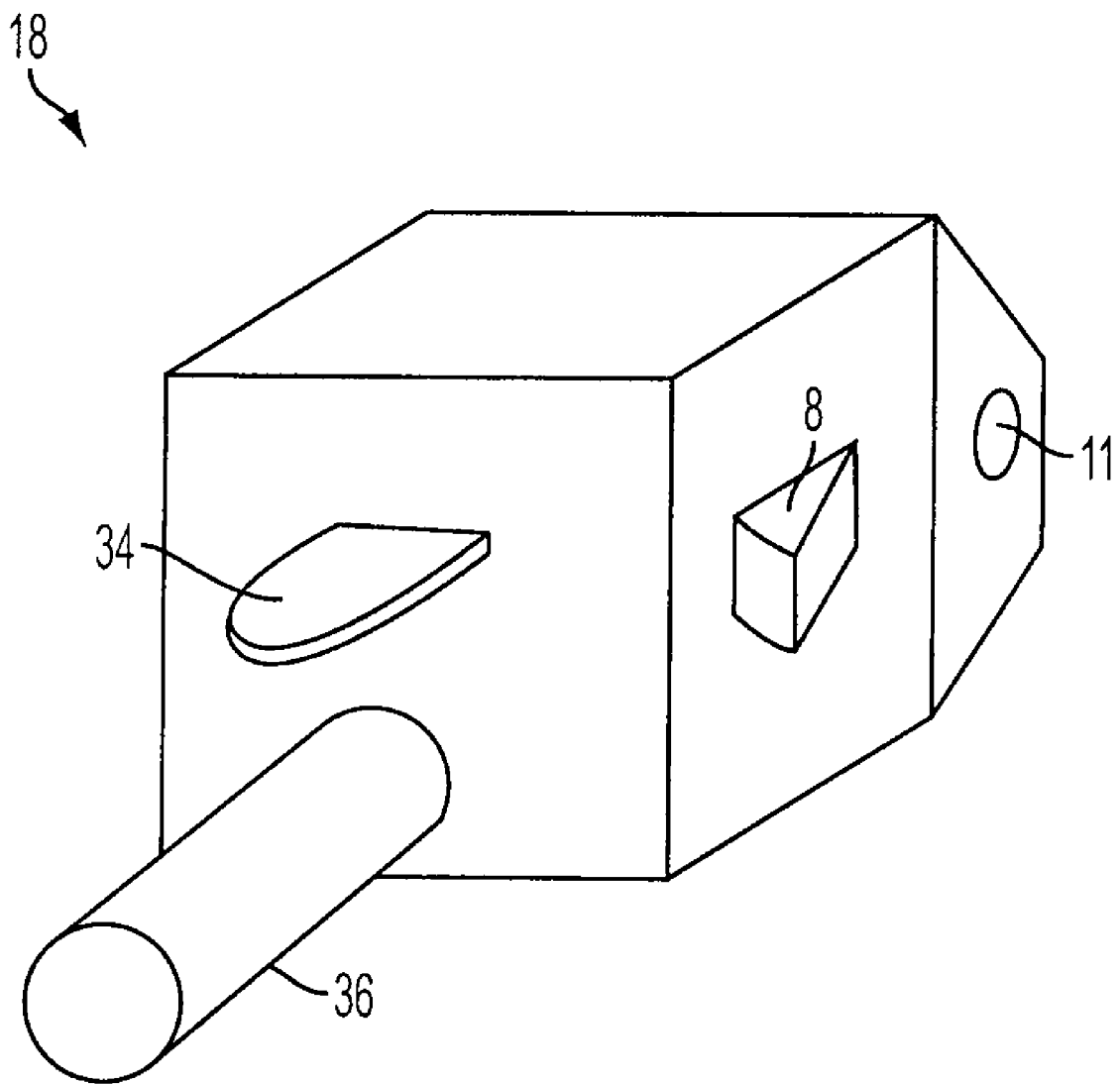
FIG. 3d illustrates an exemplary back view of an electrical connector of a recharging device according to embodiments of the invention.

FIGS. 3a through 3d illustrate an exemplary electrical connector of a recharging device according to embodiments of the invention. FIG. 3a illustrates an exemplary front view. FIG. 3b illustrates an exemplary side view. FIG. 3c illustrates an exemplary top view. FIG. 3d illustrates an exemplary back view. In the examples of FIGS. 3a through 3d, an electrical connector 18 can include a mechanism 32 on the front face of the connector to connect to an electrical receptacle. In this example, the mechanism 32 can be a 3-hole electrical socket that can receive a 2- or 3-prong electrical plug to form an electrical connection. Other mechanisms can also be used that are capable of forming an electrical connection with an electrical receptacle. The electrical connector 18 can have a contact switch 9 as previously described disposed on the front face of the connector. The electrical connector 18 can have a connector sensor 11 as previously described disposed on the connector near the distal end. In this example, a plurality of sensors 11 can be disposed on the top, bottom, and sides of the connector 18.

The electrical connector 18 can have an anchor 8 on each side of the connector to anchor the connector to the receptacle to ensure that the connector stays connected to the receptacle while recharging. Examples of such an anchor can include, but are not limited to, a hook, a magnet, or any other mechanism capable of attaching to the receptacle. In this example, a hook 8 can be disposed on each side of the connector 18, retracted into a recess 38 when not in use and extended from the recess when in use. The hook 8 may be extended from the recess 38 and retracted into the recess mechanically and/or electrically. In some embodiments, the extending and retracting can be triggered by a signal from the contact switch 9.

The electrical connector 18 can have a manual lever 34 disposed on the back of the connector to manually release the connector from the receptacle and retract the anchor 8 in the event of a power failure. The lever 34 may be released by pulling, pushing, or otherwise manually manipulating the lever.

The electrical connector 18 can be configured to have both vertical and horizontal compliance to easily adjust to the positions of various vehicle receptacles without damaging the connector or the receptacle. The electrical connector 18 can also be configured to connect without force to avoid damage. Accordingly, the electrical connector 18 can have a mechanism assembly 36 that adjusts to the positions of various vehicle receptacles. In this example, the assembly 36 can be a flexible rod including flexible material that can flex in any direction, e.g., up and down, side to side, and backward and forward, to adjust to the position of the vehicle receptacle. Alternatively, the assembly 36 can be a combination of hinged joints and springs that can move up and down, side to side, and backward and forward to adjust to the position of the vehicle receptacle.

In some embodiments, various adaptors can be connectible to the connector 18 to enable the connector to connect to multiple different types of electrical receptacles using the appropriate adaptor.

It is to be understood that the structure of the connector is not limited to that illustrated herein, but can include any structure capable of connecting to an electrical receptacle according to embodiments of the invention.

Figure 4:
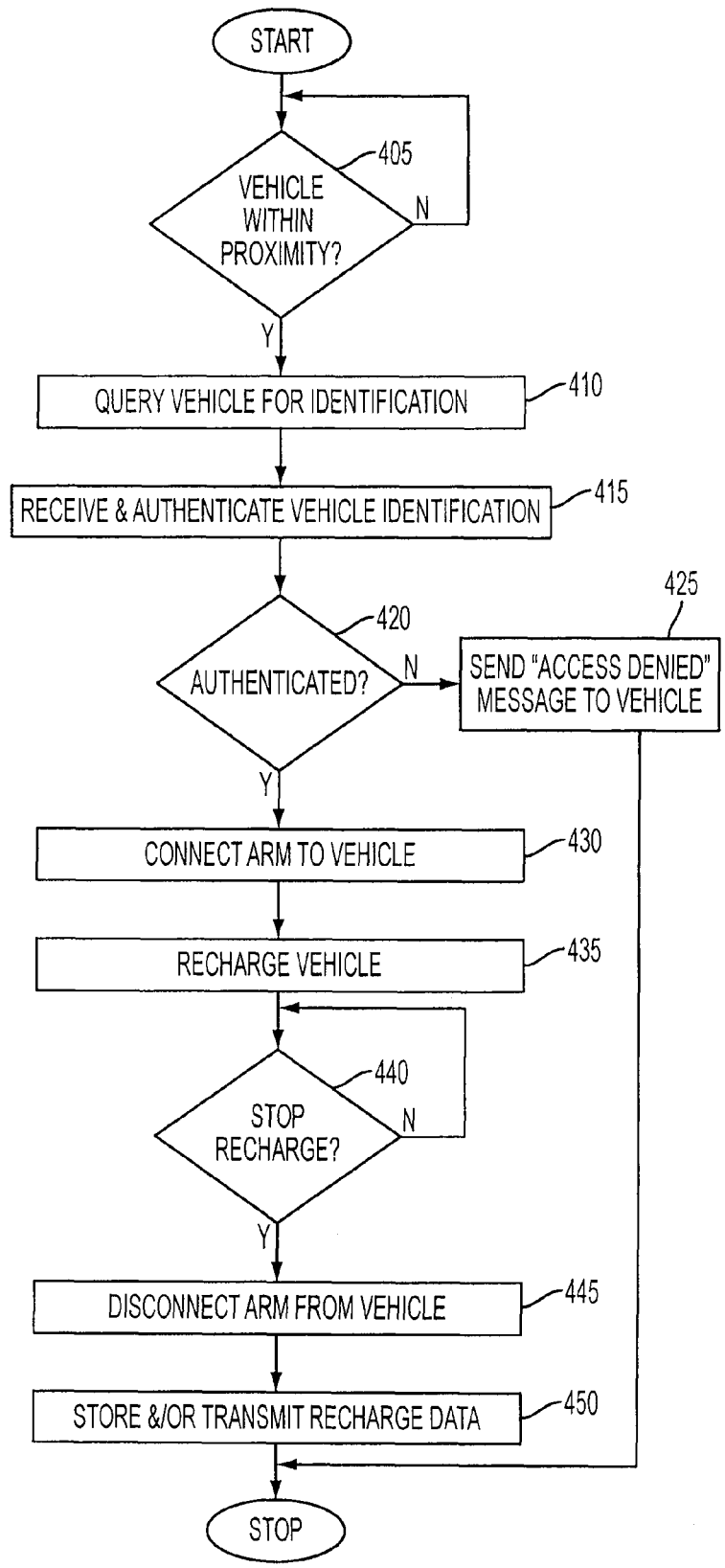
FIG. 4 illustrates an exemplary method for automatically recharging a vehicle according to embodiments of the invention.

FIG. 4 illustrates an exemplary method for automatically recharging a vehicle according to embodiments of the invention. In the example of FIG. 4, a recharging device can determine whether a vehicle is within a predetermined proximity of the device (405). To do so, the recharging device's controller can receive a signal from its proximity sensor and determine the vehicle location from the signal. Based on the determined vehicle location, the controller can determine whether the vehicle is within the predetermined proximity. The recharging device can repeated the determination until a vehicle is within the predetermined proximity. The predetermined proximity can be the maximum distance that the recharging device's robotic arm can extend to connect to a vehicle's electrical recharge receptacle. If the vehicle is at or within that maximum distance, the vehicle can be deemed to be within the predetermined proximity.

Alternatively, to determine whether a vehicle is within a predetermined proximity, the recharging device can await a recharge request from a vehicle, where the request can include the vehicle's location, and upon receipt of the request, determine whether the received location is within the predetermined proximity. If not, the recharging device can send a message to the vehicle indicating how much closer the vehicle needs to move. Concurrently therewith or alternatively, the recharging device can activate one or more of a series of lights, similar to a traffic light, on or proximate to the device to indicate to the user to move the vehicle closer (e.g., a green light), to slow down but continue to move closer (e.g., a yellow light), or to stop within the predetermined proximity to the device (e.g., a red light).

After the vehicle has moved within the predetermined proximity, the recharging device can query the vehicle for the vehicle's identification and other information (410). To do so, the controller can send the query via the first communication unit to the vehicle.

The recharging device can receive and authenticate the vehicle identification and other information (415). To do so, the controller can receive the vehicle identification via the first communication unit from the vehicle and send the vehicle identification via the second communication unit to the central server for authentication. The central server can access the vehicle's information in its database and authenticate the identification using any known authentication techniques. The server can then send authentication confirmation to the controller via the second communication unit. Alternatively, the controller can receive the vehicle's information from the server and authenticate the identification itself. Or the controller can access its local database for the vehicle's information and authenticate the identification itself.

If either the recharging device or the server is unable to authenticate the vehicle identification (420), the recharging device can send a message to the vehicle that the vehicle's identification was not authenticated (425). To do so, the controller can send the message via the first communication unit to the vehicle. Concurrently therewith or alternatively, the controller can send the message via the input/output unit to show on the recharging device's display. The recharging device can then deny access to the vehicle. Alternatively, the controller can send a request for payment to the vehicle and allow access without the identification authentication if payment is successfully remitted. Payment can be made by the user of the vehicle by inputting a credit or debit card or cash into the recharging device's input slot.

Conversely, if the vehicle's identification is authenticated (420), the recharging device can allow the vehicle to use the device. The recharging device can automatically connect to the vehicle (430). To do so, the controller can communicate to the arm drivers to extend the robotic arm toward the previously determined vehicle location. As the robotic arm extends, the controller can receive information from the connector sensor and from the arm drivers and use that information to determine the present position of the electrical connector and the position of the vehicle's electrical receptacle, compare the two positions, and compute further movements that the robotic arm can make to reach and connect to the receptacle. The controller can send information regarding the computed further movements to the arm drivers to move the robotic arm accordingly. The above can be repeated until the electrical connector connects to the electrical receptacle.

As the robotic arm extends, if the recharging device detects an obstacle between it and the vehicle, the recharging device can retract the robotic arm and await removal of the obstacle. The recharging device can also send a message to the vehicle that there is an obstacle in the way. This can be done as follows. Based on information from the proximity sensor and the connector sensor, the controller can detect the obstacle. In which case, the controller can compare the present position of the electrical connector to a predetermined retract position and compute further movements that the robotic arm can make to reach the predetermined position. The controller can send information regarding the computed further movements to the arm drivers to move the robotic arm accordingly. The above can be repeated until the electrical connector reaches the predetermined position. The controller can send a message via the first communication unit to the vehicle indicating the presence of the obstacle. Concurrently therewith or alternatively, the controller can send the message via the input/output unit to show on the recharging device's display. The controller can continue to check the proximity sensor and connector sensor information and, upon determining therefrom that the obstacle has been moved, direct the arm drivers to resume movement of the robotic arm to automatically connect the connector to the receptacle.

The recharging device can automatically recharge the vehicle via the connection between the connector and the receptacle (435). To do so, the connector can receive information from the connector sensor and/or the contact switch that the connection was made and can send a signal to the power control and measurement unit to deliver electrical current to the vehicle. The current can be delivered through a metered line to measure the quantity delivered. And the controller can read the metered quantity. Alternatively, the controller can calculate the quantity based on the measurement from the power control and measurement unit and/or the amount of time that the power control and measurement unit was in operation. Or the controller can get the quantity from an outside source having that information.

The recharging device can determine whether the recharging operation should be stopped (440). The recharging operation can be stopped if a certain condition is detected. Examples of conditions that could cause the recharging operation to stop can include the vehicle powering up, a predetermined recharge time limit being reached, the vehicle indicating that it is fully recharged, a stop signal being received, an unsafe condition being detected, e.g., an overload, and other such conditions.

To determine whether the recharging operation should be stopped, the controller can receive and process information from various circuits in the recharging device to detect a recharge-stopping condition. If no recharge-stopping condition is detected, the recharging device can continue delivering current to the vehicle through the connection between the electrical connector and the vehicle's receptacle.

Conversely, if a recharge-stopping condition is detected, the recharging device can automatically disconnect from the vehicle (445). To do so, the controller can communicate with the power control and measurement unit to shut off current. After which, the controller can communicate to the arm drivers to retract the robotic arm away from the receptacle position and toward a predetermined disconnect position. As the robotic arm retracts, the controller can receive information from the connector sensor and from the arm drivers and use that information to determine the present position of the electrical connector, compare the present position to the predetermined position, and compute further movements that the robotic arm can make to reach the predetermined position. The controller can send information regarding the computed further movements to the arm drivers to move the robotic arm accordingly. The above can be repeated until the electrical connector is at the predetermined position. The predetermined position can be a partially or fully retracted position of the arm or any other suitable position that ensures that the arm can not interfere with a vehicle approaching or leaving the recharging device.

The recharging device can store the recharge data in its local memory and/or transmit the recharge data to remote storage (450). The recharge data can include the quantity of current used to recharge the vehicle, the vehicle identification, the time and date of the connection, and the recharging device identification. If payment was remitted through the input slot of the recharging device, then the recharge data can include the payable account information, if payment was remitted by credit or debit card, or the cash amount, if payment was remitted with cash. The controller can store this data and/or can send this data via the second communication unit to the central server for further processing and/or storage.

Figure 5:
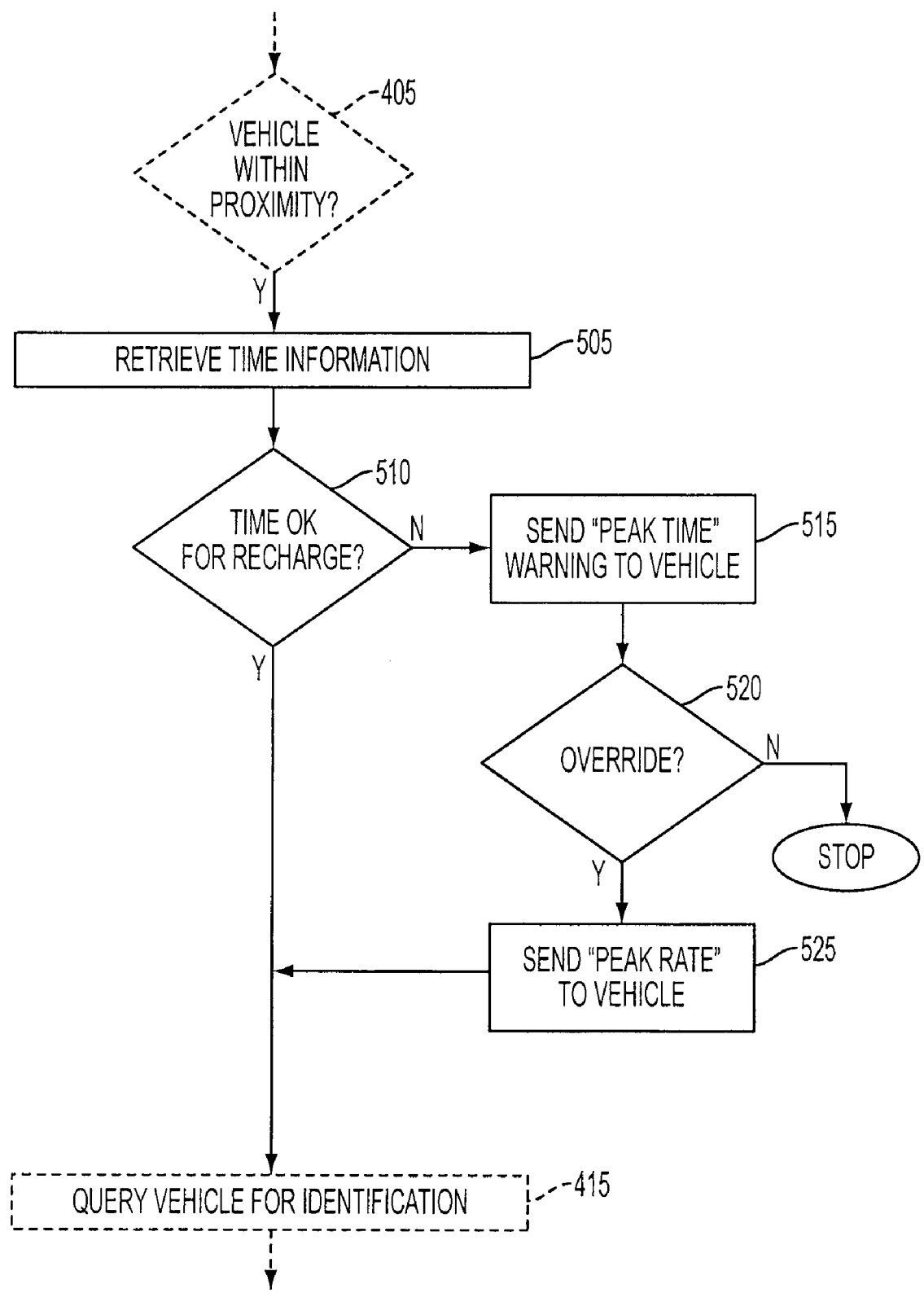
FIG. 5 illustrates another exemplary method for automatically recharging a vehicle according to embodiments of the invention.

FIG. 5 illustrates another exemplary method for automatically recharging a vehicle according to embodiments of the invention. The example of FIG. 5 is similar to the example of FIG. 4 with the following differences. In the example of FIG. 5, after the recharging device determines that the vehicle is within the predetermined proximity (405), the recharging device can retrieve present time information (505). In the context of this document, time information can include both time and date. To receive the present time information, the controller can access a local clock. Alternatively, the controller can send a query via the second communication unit to the central server for the present time information and receive the information therefrom. Or the controller can send a query to and receive the information from an outside source that has that information.

The recharging device can determine whether the present time is acceptable for recharging the vehicle (510). There may be certain times that are better for recharging than others. For example, off-peak electricity demand times, such as overnight, weekends, and holidays, may be better for recharging the vehicle in order to avoid utility overloads. If the present time is within these off-peak demand times, then the present time can be deemed suitable for recharging the vehicle. The controller can compare the present time information to a predetermined recharge time period, e.g., off-peak demand time periods, and decide that it is appropriate to recharge the vehicle if the present time corresponds to or falls within that predetermined time period.

If the present time is not acceptable for recharging the vehicle, the recharging device can send a warning to the vehicle (515). The warning can include a message that the present time is within peak demand times and that the peak rates would apply for electrical current to be used to recharge the vehicle. The warning can also include a suggested alternative time to recharge the vehicle and a listing of the off-peak rates that would apply. The controller can send the warning via the first communication unit to the vehicle. Concurrently therewith or alternatively, the controller can send the warning via the input/output unit to show on the recharging device's display.

The recharging device can determine whether there is a system override to proceed with the recharging despite the less-than-suitable present time (520). The override can come from the vehicle, for example, if the vehicle charge is so low that delaying recharge is not a viable option. The controller can check communications received from the vehicle via the first communication unit to determine whether there is an override. Other sources of the override may also be possible. If there is no override, the recharging device can cancel the recharge operation.

If there is an override, the recharging device can send another warning to the vehicle (525). The warning can include a listing of the peak rates that would apply for electrical current to be used to recharge the vehicle. The controller can send the warning via the first communication unit to the vehicle. Concurrently therewith or alternatively, the controller can send the warning via the input/output unit to show on the recharging device's display. The recharging operation can then proceed with the recharging device querying the vehicle for identification information (415) and continuing thereafter with the operation as described in FIG. 4.

Alternatively, the recharging device may receive a communication from a central server via the second communication unit about when to recharge the vehicle. For example, if the present time is not acceptable for recharging the vehicle, the central server may shut off the device immediately or after a short time period or may reduce the amount of electrical current delivered through the device. An electric utility can similarly control the device directly or can communicate with the central server to do so. Where there is a network of recharging devices, the central server or the electric utility can selectively shut off some devices to conserve power.

It is to be understood that the methods by which automatic recharging of a vehicle can be done are not limited to those illustrated herein, but can include more or less functionality consistent with the embodiments of the invention.

Figure 6:
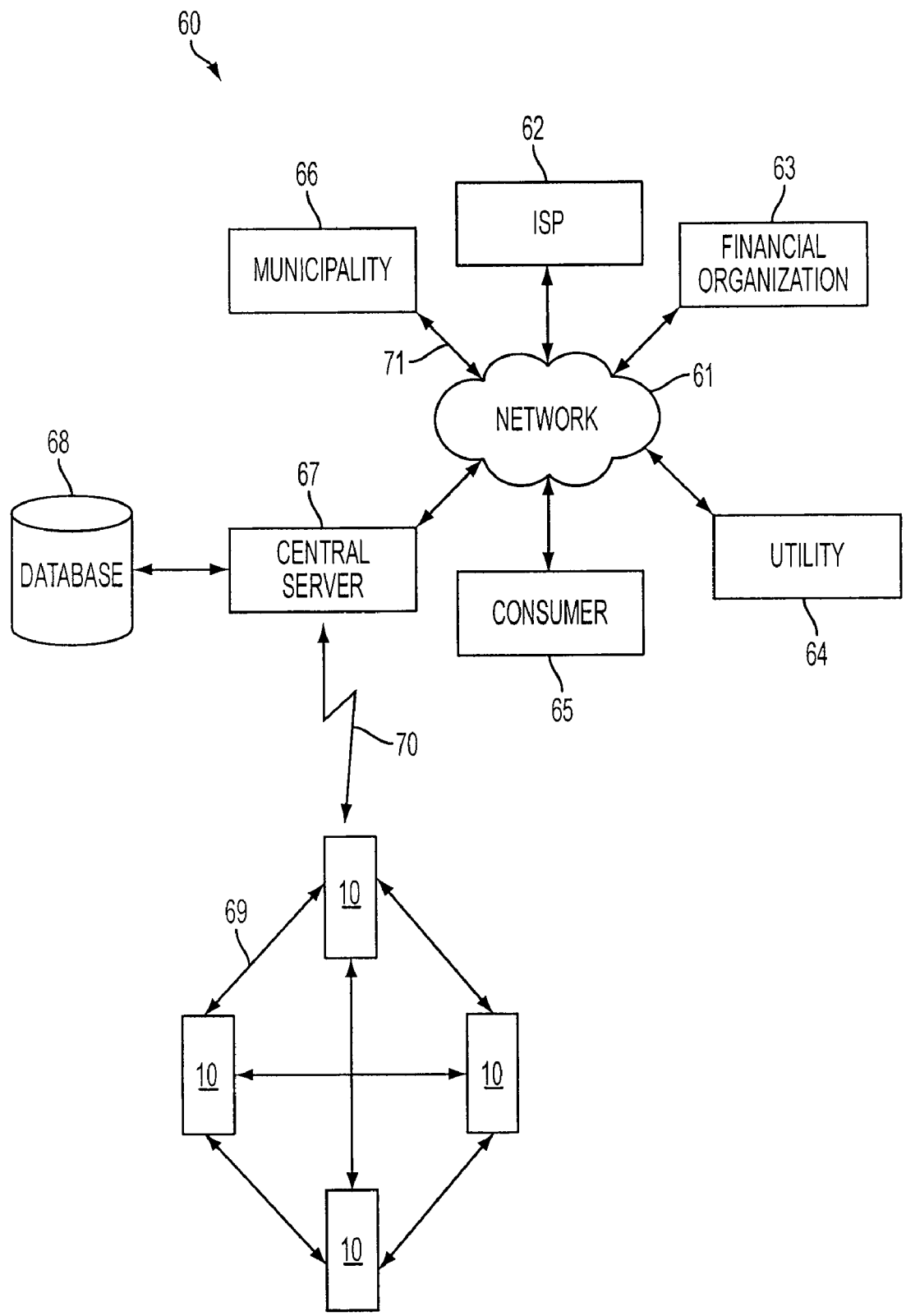
FIG. 6 illustrates an exemplary automated recharging system according to embodiments of the invention.

FIG. 6 illustrates an exemplary automated recharging system according to embodiments of the invention. In the example of FIG. 6, an automated recharging system 60 can include a network 61, such as the Internet, connecting a plurality of entities via communication links 71. For example, one entity can be a central server 67 on the network 61 that can act as an intermediary between a plurality of recharging devices 10 and other entities associated with automatic recharging of a vehicle according to embodiments of the invention. The server 67 can be a computing device configured to assist with automatically recharging a vehicle according to embodiments of the invention. An exemplary computing device will be described in more detail in FIG. 13. As described previously, the server 67 can receive recharge information from the recharging devices 10, retrieve information about the recharging devices and the vehicle to be recharged from a database 68, send that information to the recharging devices, authenticate vehicle identification, and control operation of the recharging devices. The server 67 can also manage the billing for a recharge. The server 67 can connect to the network 61 to communicate with other entities associated with automatic recharging of a vehicle. The server 67 can communicate with the recharging devices 10 via a wireless link 70. The server 67 can also communicate with the recharging devices 10 via a wired link. The server 67 can communicate with the recharging devices 10 individually or collectively. The server 67 can connect to the network 61 through a web server and provide a web interface for other entities to access the server.

The recharging devices 10 as described previously can automatically recharge a vehicle according to embodiments of the invention. The recharging devices 10 can communicate with each other via a wired connection 69. The recharging devices 10 can also communicate with each other via a wireless link, e.g., using the second communication unit as described previously. In some embodiments, the recharging devices 10 can form a mesh network, where the devices can communicate with each other and one of the devices can also communicate with the network 61 on behalf of all the devices, which can be a cost savings. The recharging devices 10 may be approximately 8-10 feet apart in the mesh network to communicate with each other. In some embodiments, the recharging devices 10 can connect to the network 61 directly.

Another entity on the network 61 can be an Internet service provider (ISP) 62 that can provide internet services and content associated with the automatic recharging of a vehicle according to embodiments of the invention. The ISP 62 can provide access at the recharging device 10 to the Internet. The ISP 62 can also stream content to the recharging device 10 for viewing on the device's display. The ISP 62 can calculate the cost for the services and content and communicate the calculated cost to the central server 67, the recharging device 10, or the vehicle. The ISP 62 can provide the rates for its services and content to the recharging devices 10.

Another entity on the network 61 can be a financial organization 63 that can provide financial services associated with the automatic recharging of a vehicle according to embodiments of the invention. Examples of the financial organization can include banks, credit unions, credit card companies, and so on. The financial organization 63 can process a payment remittance, e.g., a credit or debit card charge, cash, or a check, for a purchase made by a user at the recharging device 10. The financial organization 63 can communicate the processed transaction to the central server 67, the recharging devices 10, or the vehicle.

Another entity on the network 61 can be a utility company 64 that can provide utilities associated with the automatic recharging of a vehicle according to embodiments of the invention. An example of a utility company can include an electric company that can supply electricity to the recharging device 10 to recharge a vehicle. The utility company 64 can provide the electricity rates to the recharging devices 10, calculate the costs for the quantity of electricity used to recharge the vehicle, and provide the calculated cost to the central server 67, the recharging device 10, or the vehicle. The utility company 64 can also communicate when it is at or near capacity and/or can control operation of the recharging devices 10.

Another example of a utility company can include a telephone company that can provide telephone service associated with the automatic recharging of a vehicle. The utility company 64 can connect a telephone call made at the recharging device 10 to the public telephone network or to a cellular network. The utility company 64 can calculate the cost for the call and provide the calculated cost to the central server 67, the recharging device 10, or the vehicle. The utility company 64 can also provide the call rates to the recharging devices 10.

Another example of a utility company can include a cable or satellite television company that can supply video and audio content associated with the automatic recharging of a vehicle. The utility company 64 can supply content to the recharging device 10 to show on the device's display. The utility company 64 can calculate the cost of the content and provide the calculated cost to the central server 67, the recharging device 10, or the vehicle. The utility company 64 can provide the costs for viewing the content to the recharging devices 10.

Another entity on the network 61 can be a consumer 65 that can send and receive information associated with the automatic recharging of a vehicle according to embodiments of the invention. The consumer 65 can connect to the network 61 using a client computer that can access the central server 67 via a web interface. The consumer 65 can send information to the server 67 about a vehicle that the consumer owns and recharges using the recharging devices 10. The consumer 65 can also receive information from the server 67 about any recharging that the consumer's vehicle has done.

Another entity on the network 61 can be a municipality 66 that can provide public services associated with the automatic recharging of a vehicle according to embodiments of the invention. Examples of the municipality can include a city, a county, a state, and so on. The municipality 66 can meter parking at the recharging device 10, determine the cost for the parking, and communicate the determined cost to the central server 67, the recharging devices 10, or the vehicle. The municipality 66 can also communicate the parking rates to the recharging devices 10. The municipality 66 can also assess tolls at the recharging device 10, determine the toll, and communicate the determined toll to the central server 67, the recharging devices 10, or the vehicle. The municipality 66 can also communicate the toll rates to the recharging devices 10. The municipality 66 can also communicate public service announcements to the recharging devices 10 to show on the device's display.

It is to be understood that the structure and entities of the automated recharging system are not limited to that illustrated herein, but can include any structure and any entities capable of performing according to embodiments of the invention.

Figure 7:
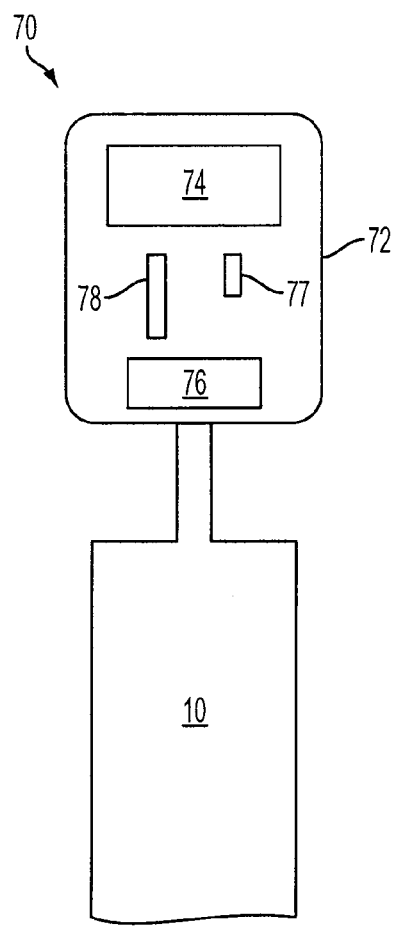
FIG. 7 illustrates an exemplary device comprising a recharging device and a parking meter according to embodiments of the invention.

FIG. 7 illustrates an exemplary device comprising a recharging device and a parking meter according to embodiments of the invention. In the example of FIG. 7, the device 70 can include a recharging device 10 as described in FIGS. 1a and 1b and a parking meter 72. Since recharging can take several hours, the device 70 can be located in a parking garage or at a parking space so that the user can recharge the vehicle at the same time that the user parks for an extended period for work, shopping, etc. The parking meter 72 can meter the vehicle's parking at the device 70 and charge the vehicle for the time that the vehicle is parked there. The parking meter 72 can include a display 74 to show the parking status, e.g., the amount of time remaining on the meter. The display 74 can also show the recharging status if the vehicle is being recharged while parked there. The meter 72 can include an input device 76, e.g., a keyboard, a mouse, a touch pad, etc., to receive input from a user. The meter 72 can include a credit or debit card slot 78 and a cash slot 77 to pay for parking and/or recharging. In an alternate embodiment, a toll meter can replace the parking meter, can include the display 74, the input device 76, the credit or debit card slot 78, and the cash slot 77, and can operate in a manner similar to the parking meter to collect tolls. The recharging device 10 can send the payment information to a central server for billing.

Figure 8:
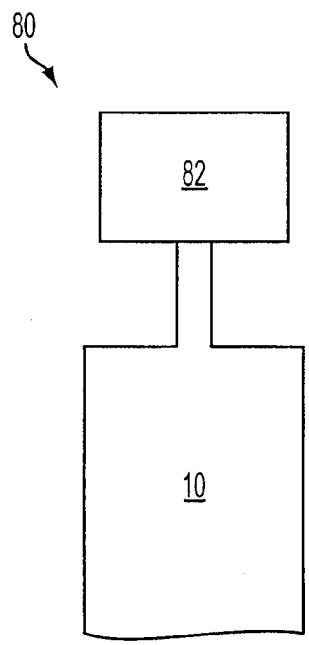
FIG. 8 illustrates an exemplary device comprising a recharging device and an Internet port according to embodiments of the invention.

FIG. 8 illustrates an exemplary device comprising a recharging device and an Internet port according to embodiments of the invention. In the example of FIG. 8, the device 80 can include a recharging device 10 as described in FIGS. 1a and 1b and an Internet port 82. The Internet port 82 can provide internet access to a user. The user can access the Internet while the user's vehicle is automatically recharging. The user can input a credit card number through the access website that can be transmitted to the ISP to pay for the Internet access or to a central server for billing.

Figure 9:
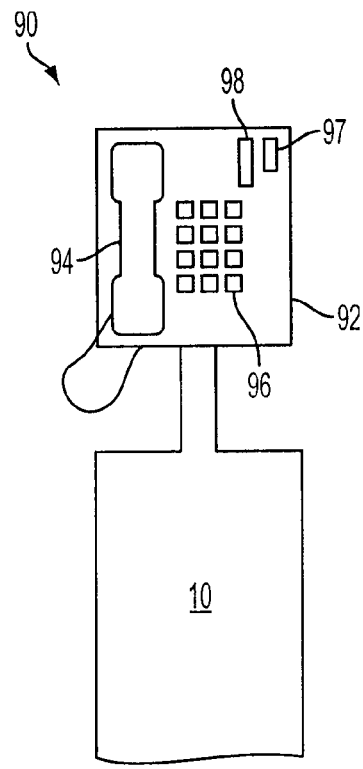
FIG. 9 illustrates an exemplary device comprising a recharging device and a public telephone according to embodiments of the invention.

FIG. 9 illustrates an exemplary device comprising a recharging device and a public telephone according to embodiments of the invention. In the example of FIG. 9, the device 90 can include a recharging device 10 as described in FIGS. 1a and 1b and a public telephone 92. The public telephone 92 can provide telephone service to a user. The user can make a telephone call while the user's vehicle is recharging. The public telephone 92 can include a receiver 94 and dial buttons 96. The telephone 92 can also include a credit or debit card slot 98 and a cash slot 97 to pay for telephone calling and/or recharging. The recharging device 10 can send the payment information to a central server for billing.

Figure 10:
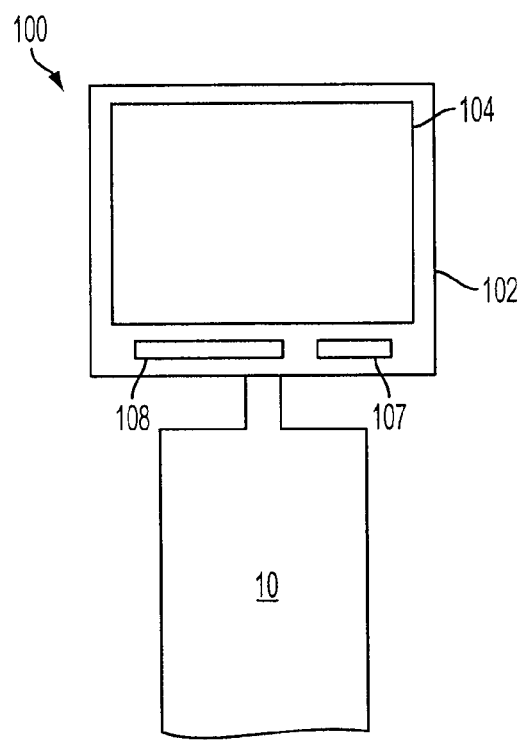
FIG. 10 illustrates an exemplary device comprising a recharging device and a display device according to embodiments of the invention.

FIG. 10 illustrates an exemplary device comprising a recharging device and a display device according to embodiments of the invention. In the example of FIG. 10, the device 100 can include a recharging device 10 as described in FIGS. 1a and 1b and a display device 102. The display device 102 can supply video and audio content, e.g., local, cable, and satellite television programs, movies on demand, pay per view content, etc., to a user. The user can view the content while the user's vehicle is recharging. The display device 102 can include a screen 104 that can show the content. The screen 104 can also show the status of the recharging. The screen 104 can be a touch screen through which the user can select the content the user wishes to view. The display device 102 can also include a credit or debit card slot 108 and a cash slot 107 to pay for viewing and/or recharging. The recharging device 10 can send the payment information to a central server for billing.

In addition to the example devices illustrated herein, other devices can be combined with the recharging devices according to embodiments of the invention to provide services and products to the user.

As shown in the above examples, a plurality of services and products can be provided to a user at a recharging device according to embodiments of the invention. Billing for these services and products can be done in a consolidated manner as illustrated in FIG. 11.

FIG. 11 illustrates an exemplary billing statement for an automated recharging system according to embodiments of the invention. In the example of FIG. 11, a monthly billing statement 1100 can show the charges that a vehicle incurred during a month that the vehicle used recharging devices. The statement 1100 can show the vehicle identification number 1105 and the time period 1110 over which the charges were incurred. The statement 1100 can list the date 1115 that the vehicle incurred the charge and the location 1120 of the recharging device 10 that the vehicle used. The statement 1100 can also list the costs incurred at the recharging devices 10. In this example, the electricity costs 1120 for automatically recharging the vehicle can be listed. The parking costs 1130 for parking at the recharging device 10 can be listed. The toll costs 1135 for collected tolls at the recharging device 10 can be listed. The total costs 1140 per date and overall can be listed.

After the recharging, parking, and/or toll operations have been completed at the recharging device 10, the recharging device can transfer the associated data to the central server 67. The central server 67 can store the received data until the next billing cycle and then generate the statement 1100. Alternatively, the recharging device 10 can store the data until the next billing cycle and then transfer the data to the central server 67 to generate the statement 1100. The user of the vehicle can receive the statement 1100 via a web interface to the server 67. In some embodiments, the user can access the user's pending charges at any time.

Figure 12:
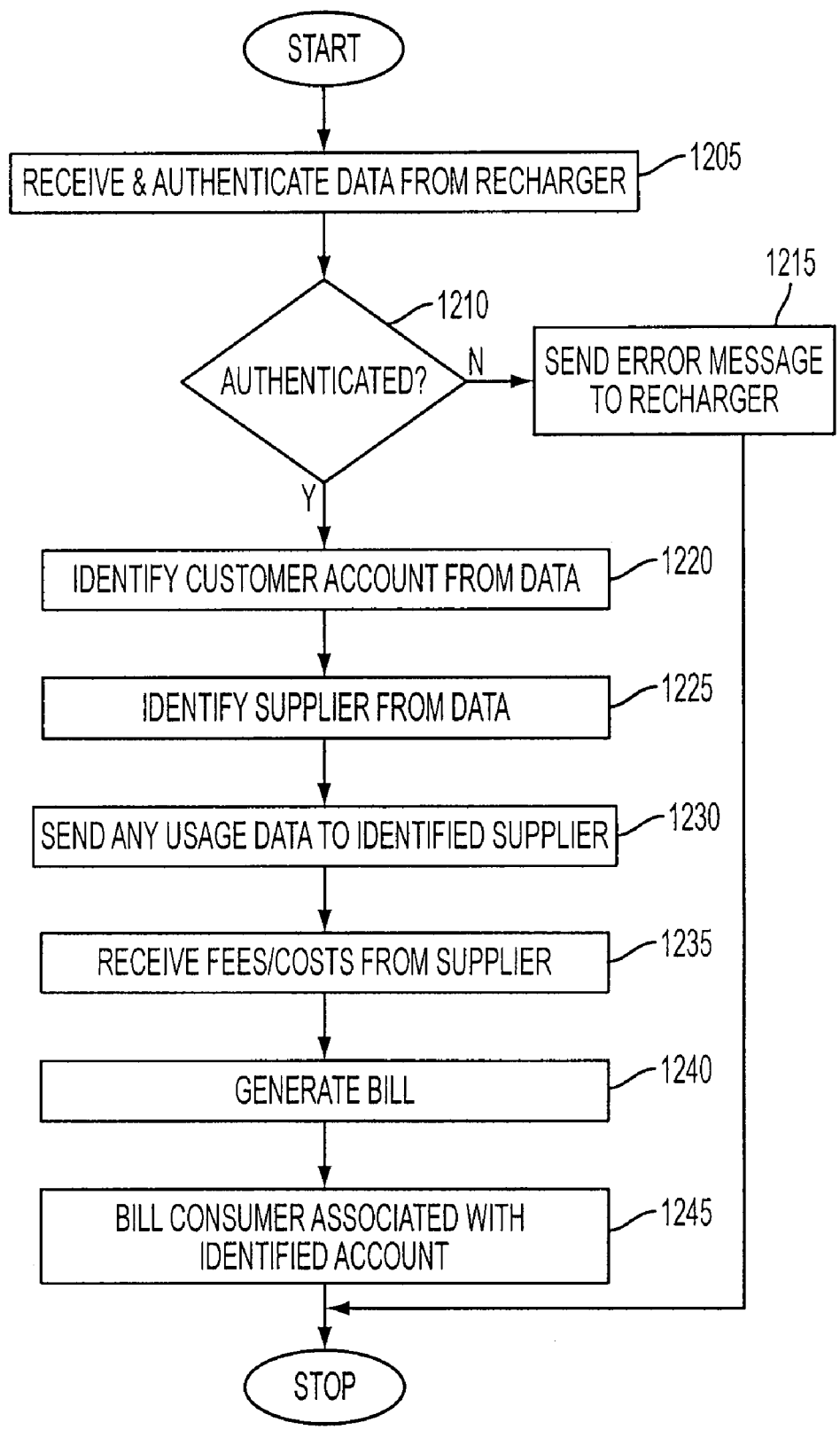
FIG. 12 illustrates an exemplary method for billing a consumer of an automated recharging system according to embodiments of the invention.

FIG. 12 illustrates an exemplary method for billing a consumer of an automated recharging system according to embodiments of the invention. In the example of FIG. 12, a central server can receive and authenticate recharge data from a recharging device (1205). To do so, the server can receive the data via its communication unit from the recharging device. The server's processor can retrieve information about the recharging device from the server's database and use the retrieved information to authenticate the data. The processor can use any known authentication techniques. As described previously, the recharge data can include the identification of the vehicle automatically recharged by the recharging device according to embodiments of the invention, the identification of the recharging device that recharged the vehicle and transmitted the data, the time and date of the recharge, the quantity of electrical current used to recharge the vehicle, and any other charges incurred at the recharging device. The recharge data can also include information about the form of payment if the user remitted a credit or debit card or paid cash.

If the server can not authenticate the recharge data (1210), the server can send an error message to the recharging device (1215). To do so, the server's processor can send the message via the server's communication unit to the recharging device. Concurrently therewith or alternatively, the processor can send the message to the vehicle. In some embodiments, the recharge data can be saved on multiple recharging devices for data reliability and security. In which case, the processor can request the data from another recharging device and authenticate the data from that recharging device.

If the server can authenticate the recharge data (1210), the server can identify the consumer from the data (1220). To do so, the server's processor can identify the vehicle identification from the data, retrieve the vehicle identification from the database, and identify the consumer and the consumer's account listed with the vehicle identification. If the vehicle identification is not already stored in the database, the processor can do so. The processor can then identify the consumer from the payment data, if remitted by the consumer at the time of the recharge. Alternatively, the processor can contact a government agency to get the consumer's identity associated with the vehicle identification. Or the processor can send a message to the recharging device to request that the consumer input the consumer's identification information.

The server can identify the entity that supplied the service or product at the recharging device from the data (1225). To do so, the server's processor can identify the recharging device identification from the data, retrieve the recharging device information from the database, and identify the providers of the service or product available from that recharging device. For example, if the recharging device can provide electrical current and metered parking, the processor can identify the electric utility that provides electricity to that recharging device and the municipality that provides metered parking at that recharging device.

The server can send via the network the relevant recharge data to the identified entity (1230). To do so, the server's processor can extract the relevant recharge data for the identified entity and send the extracted data to that entity. The extracted data can include an identification of the service or product, the quantity of the service or product provided, the recharging device that provided the service or product, and the time and date that the service or product was provided. If the consumer remitted payment, the payment amount can also be included in the extracted data.

The server can receive via the network fees and/or costs from the identified entity for the service or product provided at the recharging device (1235). The fees and/or costs can be determined by the entity based on the unit cost for the service or product and the quantity used. In some embodiments, the fees and/or costs can be determined by the entity based on the time when the service or product was provided. For example, the entity may charge different rates during off-peak and peak demand times. Alternatively, the server can receive the rates from the entity and calculate the fees and/or costs at the server.

The server can generate a bill to the consumer listing the charges incurred at the recharging devices (1240). An example of the generated bill can be the statement illustrated in FIG. 11. The server can send via the network the bill to the consumer associated with the identified consumer account (1245). Alternatively, if the consumer remitted a credit or debit card or cash, the server can send the charges to the appropriate financial organization for processing. In which case, the server can send a "paid" statement to the consumer associated with the identified consumer account.

It is to be understood that the methods by which a consumer of an automated recharging system can be billed are not limited to that illustrated herein, but can include more or less functionality consistent with the embodiments of the invention.

Figure 13:
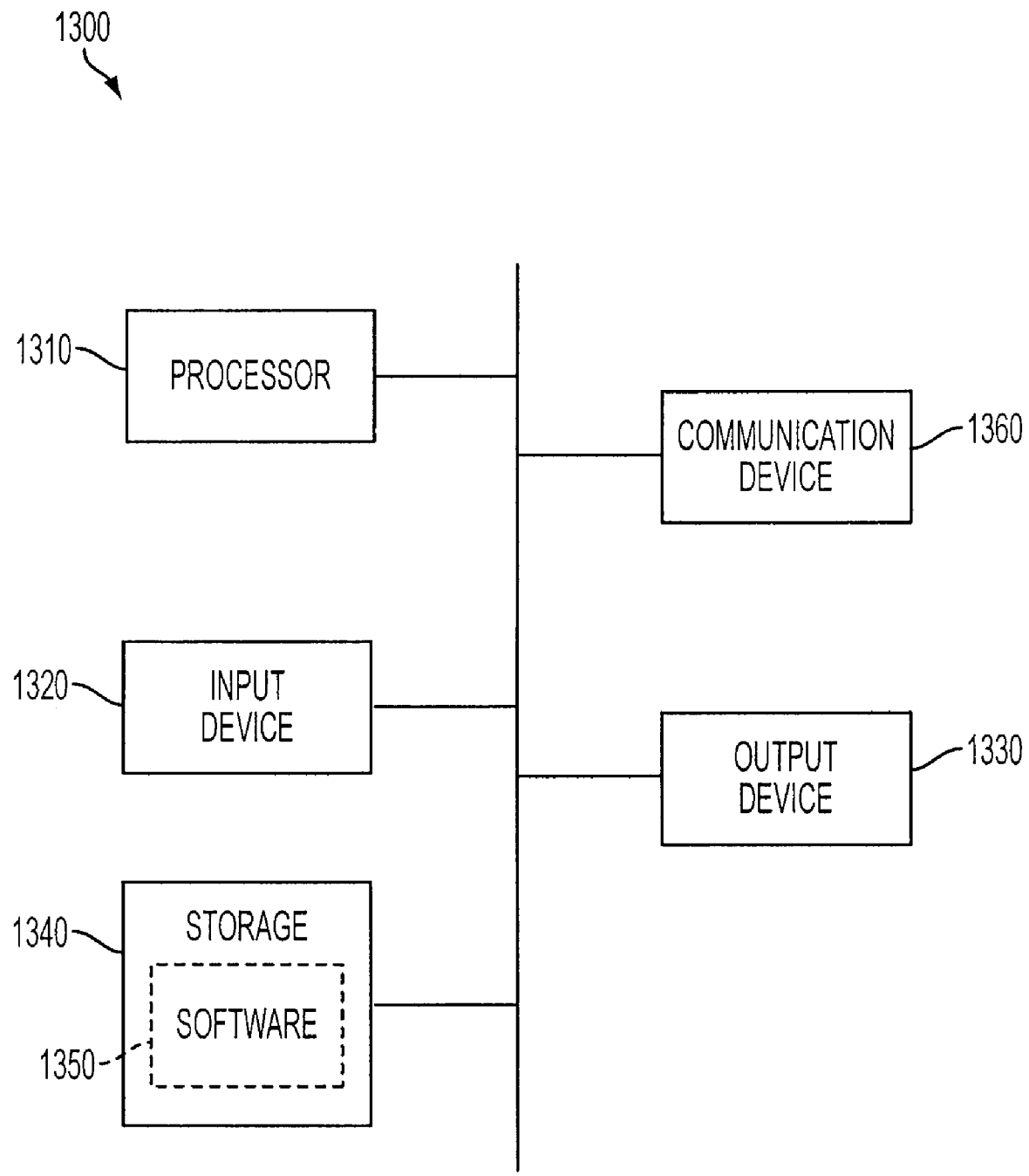
FIG. 13 illustrates an exemplary computing device according to embodiments of the invention.

FIG. 13 illustrates an exemplary computing device according to embodiments of the invention. In the example of FIG. 13, a computing device 1300 can be a workstation, server, personal computer, handheld computing device, or any other type of microprocessor-based device. The computing device 1300 can include one or more of a processor 1310, input device 1320, output device 1330, storage 1340, and communication device 1360.

The input device 1320 can include a keyboard, mouse, pen-operated touch screen or monitor, voice-recognition device, or any other device that provides input. The output device 1330 can include a monitor, printer, disk drive, speakers, or any other device that provides output.

The storage 1340 can include any volatile and/or nonvolatile data storage, including, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, flash memory such as compact flash cards, secured digital cards, USB memory devices, or memory sticks, tape drives, and the like.

The communication device 1360 can include a modem, network interface card, or any other device capable of transmitting and receiving signals over a network. The components of the computing device can be connected in any manner, such as via electrical bus or wirelessly. Communications in connection with embodiments of the invention can occur over any type of interconnected communication system/network, can implement any communications protocol, and can be secured by any security protocol. Corresponding network links can include telephone lines, DSL, cable networks, T1 or T3 lines, wireless network connections, or any other arrangement that implements the transmission and reception of network signals.

The software 1350, which can be stored in the storage 1340 and executed by the processor 1310, can include, for example, the application programming that embodies the functionality of the invention (e.g., as embodied in the automated recharging system and its components). The software 1350 can include a combination of client applications and enterprise servers such as an application server and a database server.

The software 1350 can also be stored and/or transported within any computer-readable medium, e.g., the storage 1340, for use by or in connection with an instruction execution system, apparatus, or device, such as a computer-based system, processor-containing system, or other system that can fetch the instructions from the instruction execution system, apparatus, or device and execute the instructions. In the context of this document, a computer-readable medium can be any medium that can contain or store the program for use by or in connection with the instruction execution system, apparatus, or device, e.g., the storage 1340.

The software 1350 can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a transport medium can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

The processor 1310 can perform actions based on received inputs that can include, but are not limited to, opening a file or document, viewing status information, making a selection, executing instructions, operating a recharging device, handling a telephone call, changing video or audio settings, computing, storing, and transmitting information related to vehicle recharging, logging onto a computer or a computer network, permitting authorized individuals access to restricted areas of the computer or computer network, loading a user profile, permitting access to web content, launching a particular program, encrypting or decoding a message, and/or the like. The processor 1310 can also perform additional functions that may not be related to automatic recharging of a vehicle.

Note that one or more of the functions described above can be performed by firmware stored in the storage 1340 and executed by the processor 1310. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions.

The computing device 1300 can implement any operating system, such as Windows or UNIX. The software 1350 can be written in any programming language, such as ABAP, C, C++, Java or Visual Basic. In various embodiments, application software embodying the functionality of the invention can be deployed on a standalone machine, in a client/server arrangement or through a Web browser as a Web-based application or Web service, for example.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. In a system including a recharging device having a connector configured to connect to a vehicle via a receptacle, a method for automatically recharging the vehicle, the method comprising:
   determining whether the vehicle is within a predetermined distance of the recharging device by:
      detecting the location of the vehicle based on a signal from the vehicle,
      calculating the distance between the detected location and the recharging device, and
      determining that the vehicle is within the predetermined distance if the calculated distance is less than or equal to the predetermined distance;
   automatically connecting the connector to the receptacle based on the determination; and
   automatically recharging the vehicle through the connection.

2. The method of claim 1, further comprising:
   communicating with the vehicle to exchange information with the vehicle.

3. The method of claim 2, wherein the communicating is via an electromagnetic medium.

4. The method of claim 2, further comprising:
   authenticating the information received from the vehicle.

5. The method of claim 4, further comprising:
   if the authenticating fails, sending a message to the vehicle that the vehicle can not be recharged.

6. A computer readable medium storing a set of instructions for automatically recharging a vehicle, the instructions, when executed by a processor, causes the processor to:
   determine a location of the vehicle toward which to extend a recharging device by:
      detecting the location of the vehicle based on a signal from the vehicle,
      calculating the distance between the detected location and the recharging device, and
      determining that the vehicle is within the predetermined distance if the calculated distance is less than or equal to the predetermined distance,
   direct the recharging device to automatically connect to the vehicle at the determined location, and
   direct the recharging device to automatically recharge the vehicle through the connection,
   wherein the computer readable medium is selected from the group consisting of an electronic, magnetic, optical, electromagnetic, infrared storage, semiconductor system, a portable computer diskette, a random access memory, a read-only memory, an erasable programmable read-only memory and a portable optical disc.

7. The computer readable medium of claim 6, wherein the processor transmits a signal to a display unit to display a status of the recharging device.

8. The computer readable medium of claim 6, wherein the processor receives data including a form of payment for the recharge of the vehicle.

9. The computer readable medium of claim 6, wherein, when directing the recharging device to automatically connect, the processor
   receives a signal from a connection sensor indicating the position on the vehicle to which to connect the recharging device, and
   directs the recharging device to automatically connect to the indicated position on the vehicle based on the received signal.

10. The computer readable medium of claim 9, wherein, when directing the recharging device to automatically connect, the processor
    receives a second signal from the connection sensor indicating that an obstacle is present between the recharging device and the indicated position, and
    directs the recharging device to retract to a predetermined position.

11. The computer readable medium of claim 6, wherein, when directing the recharging device to automatically connect, the processor transmits a signal to the recharging device to extend toward the determined location of the vehicle.

12. The computer readable medium of claim 6, wherein, when directing the recharging device to automatically recharge, the processor transmits a signal to the recharging device to send an electrical current through the connection to the vehicle.

13. The computer readable medium of claim 6, wherein the processor is further caused to direct the recharging device to automatically stop recharging the vehicle and to automatically disconnect from the vehicle when the recharge stops.

* * * * *